United States Patent [19]
Bray

[11] Patent Number: 5,758,304
[45] Date of Patent: May 26, 1998

[54] ELECTRONIC TRANSMISSION SHIFT CONTROL

[75] Inventor: Steven C. Bray, Washington, Ill.

[73] Assignee: Caterpillar Inc., Peoria, Ill.

[21] Appl. No.: 534,604

[22] Filed: Sep. 27, 1995

[51] Int. Cl.$^6$ ............................................. G06G 7/70
[52] U.S. Cl. .................. 701/63; 701/51; 701/62; 701/64; 74/335; 74/336 R; 477/906
[58] Field of Search ........................ 364/424.08, 424.07, 364/424.095, 424.081, 424.05, 424.082, 424.087, 551.01, 571.05; 477/107, 115, 906, 109, 120, 127, 133, 154, 155, 162, 65; 74/335, 336 R, 337, 359, 732.1; 475/127, 123, 120; 701/51, 62, 63, 64; 340/653, 438, 455

[56] References Cited

U.S. PATENT DOCUMENTS

| | | | |
|---|---|---|---|
| 4,245,271 | 1/1981 | Gwin | 361/189 |
| 4,485,694 | 12/1984 | Mochida | 74/850 |
| 4,667,541 | 5/1987 | Shimaoka et al. | 364/424.092 |
| 4,835,694 | 5/1989 | Yamamoto et al. | 364/424.092 |
| 4,849,899 | 7/1989 | Cote et al. | 364/424.092 |
| 4,896,569 | 1/1990 | Ito et al. | 364/424.091 |
| 4,939,502 | 7/1990 | Ito et al. | 364/424.091 |
| 4,949,215 | 8/1990 | Studtmann et al. | 361/154 |
| 4,969,099 | 11/1990 | Iwatsuki et al. | 364/424.091 |
| 5,016,174 | 5/1991 | Ito et al. | 364/424.088 |
| 5,094,126 | 3/1992 | Stainton et al. | 364/424.091 |
| 5,197,003 | 3/1993 | Moncrief et al. | 364/424.088 |
| 5,235,527 | 8/1993 | Ogawa et al. | 364/431.11 |
| 5,305,657 | 4/1994 | Bray et al. | 74/861 |
| 5,598,334 | 1/1997 | Shin et al. | 364/424.07 |

*Primary Examiner*—Jacques H. Louis-Jacques
*Attorney, Agent, or Firm*—Mario J. Donato, Jr.

[57] ABSTRACT

An electronic transmission shift control is provided wherein an input device such as a vehicle control lever is connected to a sensor. The sensor sends out a substantially continuous signal to an electronic control module. The electronic control module controls the current going through a solenoid that, in one application, is controlling the pressure of a valve to engage a clutch in a transmission.

7 Claims, 3 Drawing Sheets

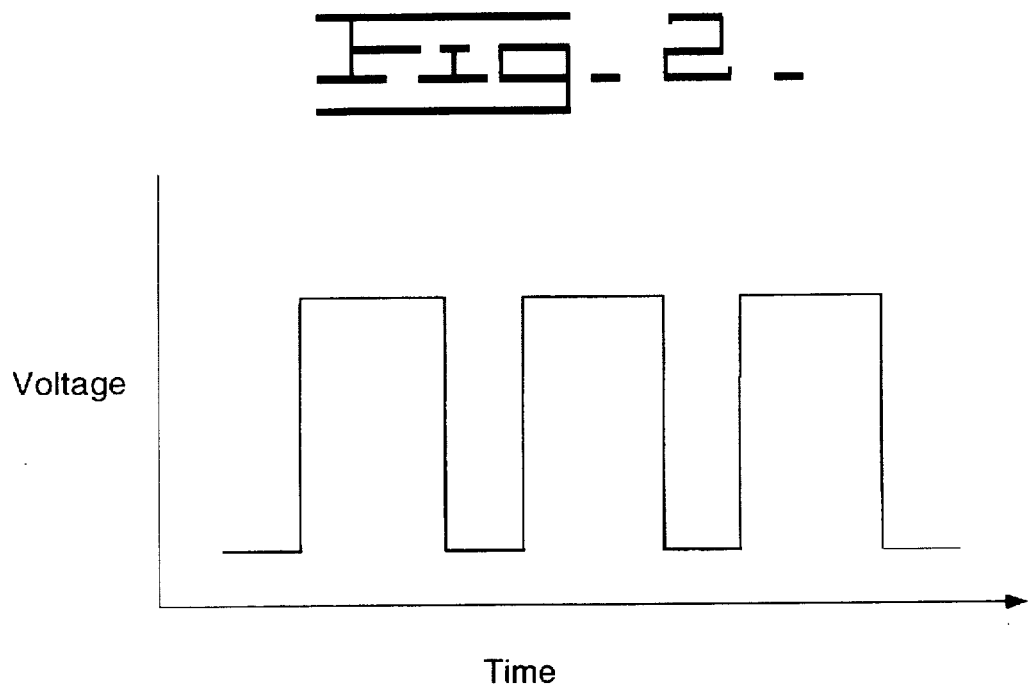
Voltage
Time
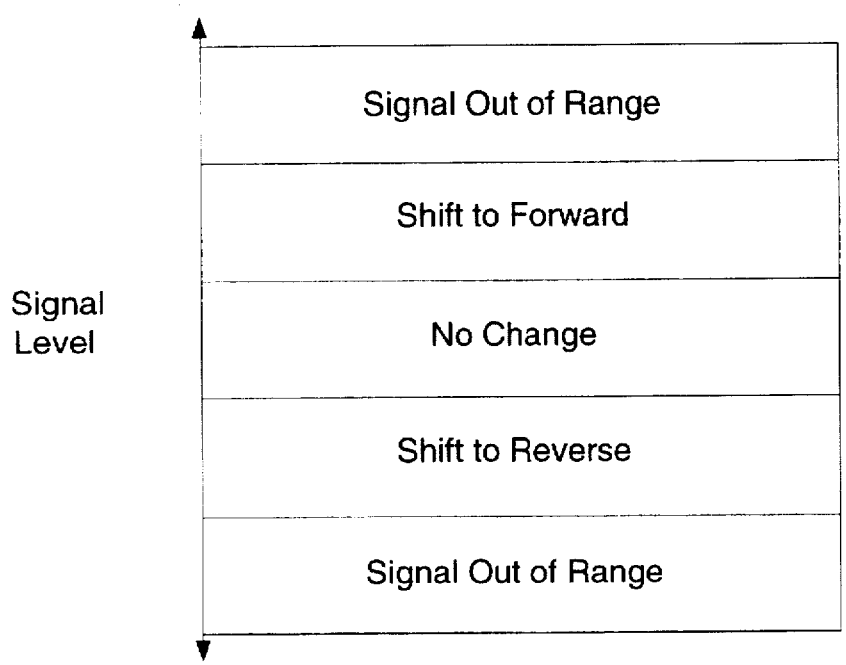

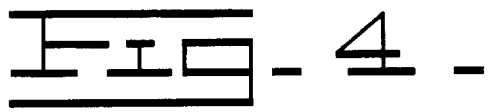
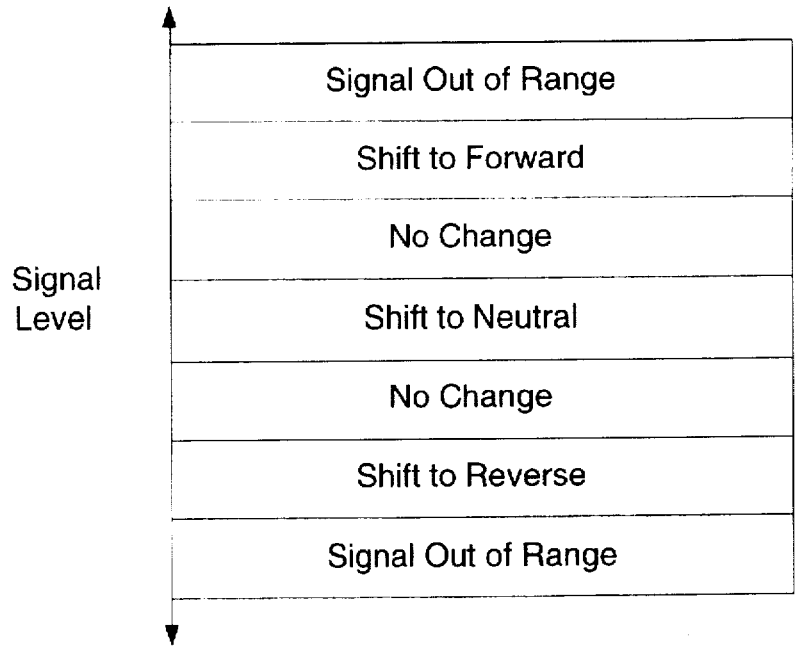
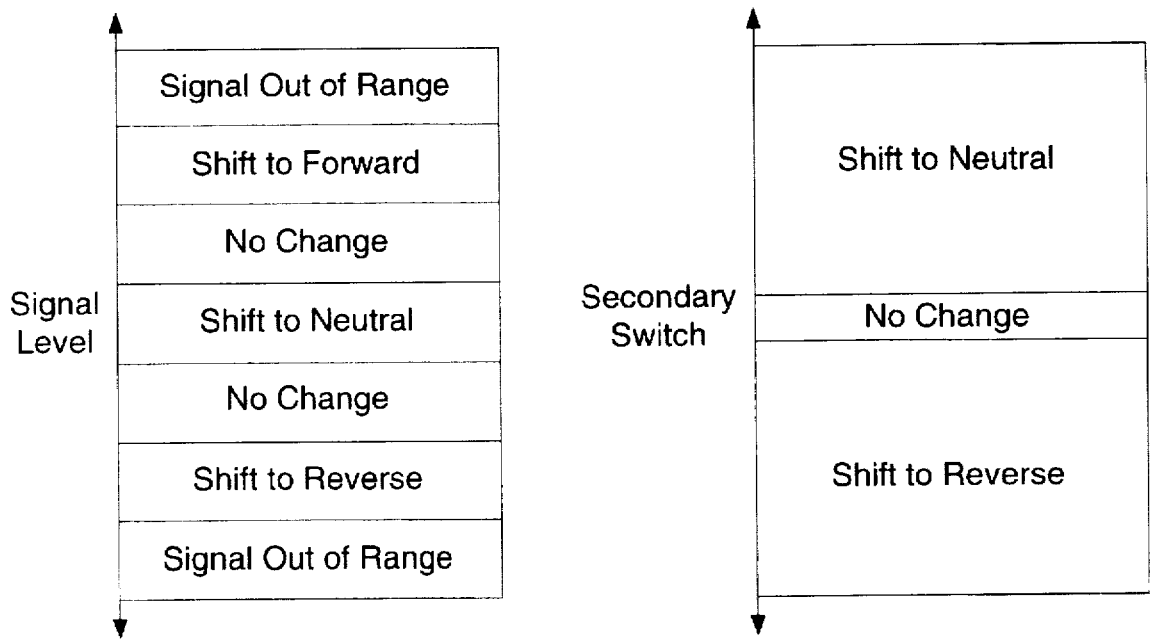

5,758,304

ELECTRONIC TRANSMISSION SHIFT CONTROL

TECHNICAL FIELD

This invention relates generally to an electronic transmission shift control and, more particularly, to an electronic transmission shift control wherein an operator input device such as a vehicle control lever is connected to a sensor sending out a continuous signal, thereby improving the reliability of shifting.

BACKGROUND ART

Initiation of a shift is a discrete event, and electronic transmission controls typically use a switch or similar input to indicate the intention to shift. Redundant switch contacts can be added to avoid unintentional shifts. Reliability of shifting is also important. Unfortunately, with switches and similar input devices that change state, it is often not possible to verify that they will be able to change state when needed. Redundant switches to prevent unintentional shifts make shifts less reliable because all switches need to change state. With redundant switches, if one fails to change state, the inconsistency can be detected, but not until the failed state is needed to make a shift. If an open circuit occurs on a switch that must close, for example, to shift from forward to reverse, the failure is not detected until the shift is attempted.

The present invention is directed to overcoming one or more of the problems as set forth above.

DISCLOSURE OF THE INVENTION

In one aspect of the present invention, an electronic transmission shift control is provided wherein an input device such as a vehicle control lever is connected to a sensor. The sensor sends out a substantially continuous signal to an electronic control module. The electronic control module typically is controlling the current going through a solenoid that, in one application, is controlling the pressure of a valve to engage a clutch in a transmission.

The present invention provides an improvement over typical electronic transmission controls using a switch or similar input to indicate the intention to shift in that by using an input device with a substantially continuous signal rather than a two state signal (e.g. on or off), most electrical problems can be detected as soon as they occur rather than having to wait until a shift is attempted.

BRIEF DESCRIPTION OF THE DRAWINGS

FIG. 2 is a graph of one possible sensor using a pulse width modulated signal;

FIG. 3 is a graph showing distinct ranges of signal level for shifting wherein the sensor is controlling forward and reverse directional shifts;

FIG. 4 is a graph showing distinct ranges of signal level for shifting wherein the sensor is controlling forward, neutral and reverse directional shifts;

FIG. 5 shows a graph wherein a secondary switch is added which is mechanically tied to the sensor to provide some functionality if the sensor fails.

DESCRIPTION OF THE PREFERRED EMBODIMENT

Figure 1:
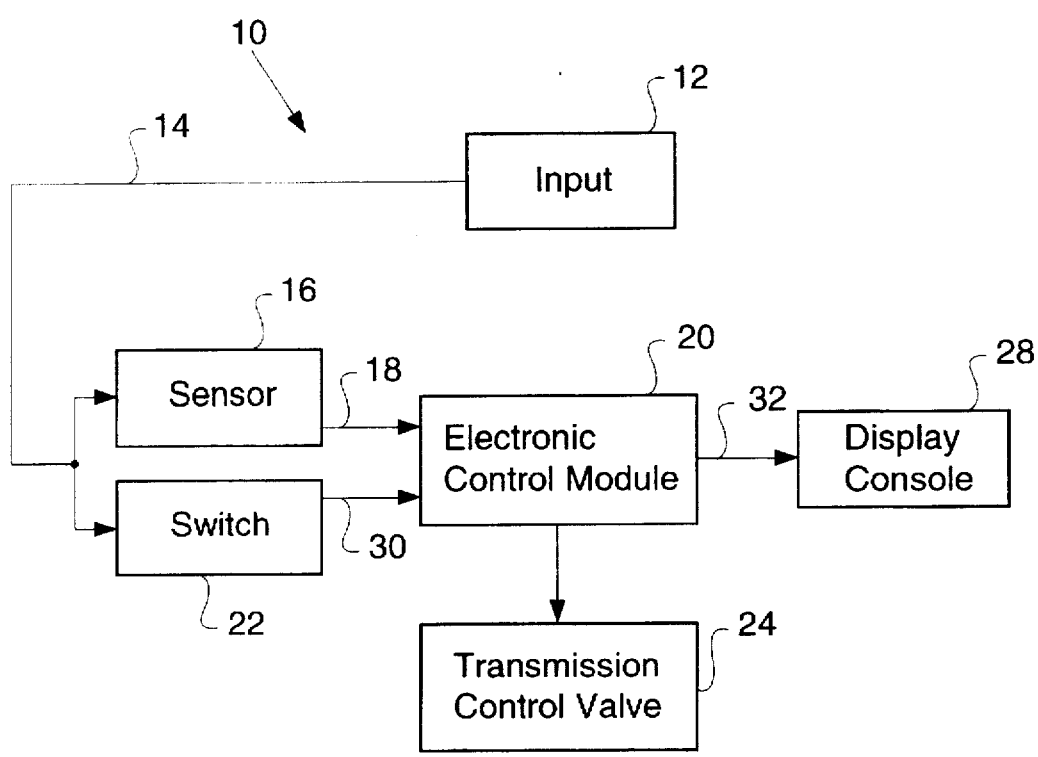
FIG. 1 is a block diagram of the present invention.

With reference to FIG. 1, the present invention provides an apparatus 10 for electronic transmission shift control. An input 12, which may be an operator input such as a gear shift lever or rocker, is connected to shift control sensor 16 via line 14. Sensor 16 outputs a substantially continuous signal 18 to electronic control module 20. Electronic control module 20 is controlling the current going through a solenoid (not shown) that, in this specific application, is controlling the pressure to a transmission control valve 24 to engage a clutch in a transmission. The electronic control module 20 outputs a signal 32 to an operator display console 28 or other output display device that would inform the operator of a failure.

Referring now to FIG. 2, the output of sensor 16 is shown. In the preferred embodiment, the output 18 of sensor 16 is a pulse width modulated signal. As seen in FIG. 2, the signal alternates between two distinct states at a fixed frequency. The signal level is defined by the percent time at one of the states or by pulse duration. For example, the signal may be modulated between two voltage levels, and inside the control module 20 is contained an intermediate voltage level that is compared to the pulse width modulated signal such that if the pulse width modulated signal is above or below the preselected intermediate voltage, the sensor signal is considered either high state or low state. Once a determination is made whether the signal is at a high state or low state, then circuitry measures the duration of the high state or low state. Generally, most failures result in total loss of the pulse or pulses which are out of the normal operating range. Therefore, if for some reason an open circuit exists, the typical failure is that the sensor will no longer pulse and if it stops pulsing, the sensor signal goes to one extreme or the other (e.g. if it loses battery or ground or the signal wire or has internal failures, then the sensor typically stops pulsing). Furthermore, the sensors 16 also have mechanical limits so that mechanically they cannot go to a position that would cause the signal to either stay high or low and stop pulsing, so if the sensor is electrically and mechanically intact, it typically keeps pulsing.

It will be appreciated by those skilled in the art that there are alternate ways to encode the signal; for example, the pulse can be a fixed duration pulse and the frequency may be varied to arrive at the signal level. Any continuous signal wherein the difference between a valid signal and an invalid signal can be easily detected is contemplated.

Referring to FIG. 3, a graphical representation is shown wherein the sensor is controlling forward and reverse directional shifts. As seen in FIG. 3, a range of signal levels is shown wherein at both extremes of the signal level, the signal is considered invalid or out of range thereby indicating that a failure is present. For example, the bottom of FIG. 3 might be steady at the low signal level and the top of FIG. 3 the signal may remain steady at the high signal level and halfway in between may be on half the time at the low signal level and off half the time at the high signal level. It should be noted that the range of the signal corresponds to a range of on-time of that signal. As seen in FIG. 3, a range is shown where a shift would be made to forward and a range is shown where a shift would be made to reverse. Between those two ranges is a range where the transmission would stay in forward or reverse with no changes. The reason for putting in a range between shifting to forward and shifting to reverse is because of the noise on a signal and while a transition is being made, it is beneficial to not have the transmission alternating between the two directions.

Referring to FIG. 4, a graphical representation is shown wherein the sensor is controlling forward, neutral, and reverse directional shifts. As seen in FIG. 4, a range of signal levels is shown wherein at both extremes of the signal level, the signal is considered invalid or out of range thereby indicating that a failure is present. For example, the bottom of FIG. 4 might be steady at the low signal level and the top of FIG. 4 the signal may remain steady at the high signal level and halfway in between may be on half the time at the low signal level and off half the time at the high signal level. It should be noted that the range of the signal corresponds to a range of on-time of that signal. As seen in FIG. 4, a range is shown where a shift would be made to forward, and a range is shown where a shift would be made to neutral, and a range is shown where a shift would be made to reverse. Between the forward range and the neutral range is a range where the transmission would stay in forward or neutral with no changes. The reason for putting in a range between shifting to forward and shifting to neutral is because of the noise on a signal and while a transition is being made, it is beneficial to not have the transmission alternating between the two directions. Between the neutral range and the reverse range is a range where the transmission would stay in neutral or reverse with no changes. Because of the same need for the range between shifting to forward and shifting to neutral, the reason for putting in a range between shifting to neutral and shifting to reverse is because of the noise on a signal and while a transition is being made, it is beneficial to not have the transmission alternating between the two directions.

Referring to FIG. 5, a graphical representation showing a secondary control switch 22 (FIG. 1) which may be added to provide some functionality if the primary sensor 16 fails. Switch 22 outputs a signal 30 to the electronic control module. As seen in FIGS. 1 and 5, switch 22 is a simple two-position switch indicating reverse or neutral wherein switch 22 is mechanically tied to sensor 16 so that when a shift is indicated by the operator of the vehicle, switch 22 and sensor 16 transition together. However, switch 22 and sensor 16 are separate electrical signals which are each input to the electronic control module 20 which compares the two. In practice, the signal from the sensor 16 and the signal from the switch 22 are compared to make sure that they are consistent; if the sensor indicates that the transmission should be in reverse, the switch should also indicate that the transmission should be in reverse; if the sensor indicates that the transmission should be in forward or neutral, the switch should indicate that the transmission is in neutral. Although FIG. 5 depicts a two-position switch, it is contemplated that sensor and switch redundancy could be extended to a multi position switch or to another sensor.

Industrial Applicability

With reference to the drawings and in operation, the present invention provides an electronic transmission shift control utilizing an input device with a substantially continuous signal so that most electrical problems can be detected as soon as they occur. As described above, the apparatus includes an operator controlled shifting device connected to a shift control sensor having a substantially continuous signal output. The control sensor is connected to an electronic control module that controls current to a solenoid on a transmission control valve, the transmission control valve regulating pressures to engage a clutch in a transmission. A sensor with a substantially continuous signal output is used so that a failure is detected prior to the shift being attempted.

Other aspects, objects, and features of the present invention can be obtained from a study of the drawings, the disclosure, and the appended claims.

I claim:

1. An electronic transmission shift control, comprising:
   means for initiating a shift of a transmission;
   means for sensing the initiation of the shift and producing a substantially continuous signal in response thereto;
   means for receiving the substantially continuous signal, comparing the substantially continuous signal to a predetermined operating range, and producing a first transmission control output in response thereto;
   second means for sensing the initiation of the shift and producing a second signal in response thereto, said second signal being received by said means for receiving the substantially continuous signal and compared to a second predetermined operating range, wherein a second transmission control output is produced, said means for receiving said substantially continuous signal comparing the first and second transmission control outputs; and
   means for receiving the first and second transmission control outputs and for shifting the transmission when said means for sensing and said second means for sensing being redundant, thereby allowing the functionality of said means for sensing and said second means for sensing to be verified.

2. An apparatus as recited in claim 1, wherein said means for initiating is an operator input.

3. An apparatus as recited in claim 1, wherein said means for receiving the substantially continuous signal comprises an electronic control module.

4. An apparatus as recited in claim 1, wherein said means for receiving the transmission control output comprises a transmission control valve, said transmission control valve engaging a clutch in said transmission.

5. An apparatus as recited in claim 1, wherein said substantially continuous signal is a pulse width modulated signal.

6. An apparatus as recited in claim 1, wherein said means for receiving the substantially continuous signal includes means for producing a fault signal when said substantially continuous signal is outside of said predetermined operating range.

7. An apparatus as recited in claim 6, including a display device, said display device receiving said fault signal and visually displaying a fault condition.

* * * * *